US006551672B2

(12) United States Patent
Hessok et al.

(10) Patent No.: US 6,551,672 B2
(45) **Date of Patent: *Apr. 22, 2003**

(54) UNIVERSAL CONTAINER FOR MEDICINAL PURPOSE

(75) Inventors: Lothar Hessok, Muellheim (DE); Jean Marie Dethier, Waremme (BE); Frank Peterson, Muellheim (DE); Michael Spallek, Ingelheim (DE)

(73) Assignee: Schott Glas, Mainz (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,455

(22) Filed: Jul. 9, 1999

(65) Prior Publication Data

US 2002/0081401 A1 Jun. 27, 2002

(30) Foreign Application Priority Data

Jul. 11, 1998 (DE) ........................................ 198 31 112

(51) Int. Cl.[7] ........................ B29D 22/00; B29D 23/00; B65D 75/00; B65D 70/02

(52) U.S. Cl. ...................... 428/34.4; 428/426; 206/168; 215/382

(58) Field of Search .............................. 428/34.4, 35.7, 428/36.7, 212, 218, 228, 426, 500, 504, 505, 828, 34.1; 206/168, 438; 215/370, 382

(56) References Cited

U.S. PATENT DOCUMENTS 4,189,382 A * 2/1980 Zine, Jr. ...................... 210/46
4,762,241 A * 8/1988 Lang .......................... 215/250
4,785,948 A * 11/1988 Strassheimer ............... 215/1 C
5,344,036 A 9/1994 Stanescu et al. ............ 215/251
5,648,133 A * 7/1997 Suzuki et al. ............ 428/36.92
5,853,829 A * 12/1998 Krishnakumar et al. ... 428/35.7

FOREIGN PATENT DOCUMENTS

| | | | | |
|---|---|---|---|---|
| DE | 196 22 550 A1 | | 12/1997 | |
| FR | 929 189 | | 12/1947 | |
| FR | 2 578 426 | * | 9/1986 | .......... A61M/11/02 |
| GB | 1141172 | | 1/1969 | ........... B65D/21/02 |
| WO | 98/29314 | | 7/1998 | |

OTHER PUBLICATIONS

Patent Abstract of Japan: 08322908 A, Dec. 10, 1996.

Patent Abstract of Japan, vol. 1997, No. 04, Apr. 30, 1997 & JP 08 322908 a, Dec. 1996.

* cited by examiner

*Primary Examiner*—Harold Pyon
*Assistant Examiner*—Michael Miggins
(74) *Attorney, Agent, or Firm*—Michael J. Striker

(57) ABSTRACT

The improved glass container for freeze-dried products includes a casing section (1) with a bottom portion (3) and an outlet portion (2). The casing section (1) is thin-walled in comparison to the bottom portion (3) and the outlet portion (2) is formed so as to be closable by a closure device. The bottom portion (3) has a nonuniform geometry and is provided with at least one interior depression (3*b*), a reinforced section (3*a*) and an outer bottom surface (3*o*) that is completely planar or planar with a comparatively slight central indentation (3*c*) but with a sufficient contact area for a cooling plate used in freeze-drying. The structure of the bottom portion guarantees a uniform crystalline lyophilizate structure. The glass container has a very low breakage rate and can be nearly completely emptied.

6 Claims, 3 Drawing Sheets

UNIVERSAL CONTAINER FOR MEDICINAL PURPOSE

BACKGROUND OF THE INVENTION

1. Field of the Invention

The present invention relates to a universal container for medicinal purposes and, more particularly, to a universal container for liquid and solid medicinal preparations.

This invention is particularly relevant to storage and in situ preparation of freeze-dried medicinal products. The problems occurring in this type of application are described in the following background section, but the invention is not limited to this particular application.

2. Prior Art

Special medicinal products, pharmaceuticals, such as diagnostic preparations, are marketed as freeze-dried products in containers, because of pharmaceutical lifetime and stability considerations. The freeze drying, the lyophilization, typically occurs in such a way that the liquid to be lyophilized in the container is subjected to a freeze-drying process, in which the container is washed prior to filling and is sterilized. After the freeze-drying closure with an elastic stopper occurs and the resulting product is conveyed to further processing steps. Immediately prior to use the lyophilized medicinal substance is dissolved by introducing a liquid and typically taken up in a syringe device with a needle.

A series of requirements or specifications have been established for the above-named container. The first requirements relate to the material used for the container.

Glass is given priority over plastic as the material used for the container for freeze-drying or for storage of the freeze-dried medicinal products. This is because glass provides an extraordinarily high barrier to water vapor or steam, $CO_2$ and oxygen, in contrast to that provided by plastic and is thus universally useable for many medicinal products. Individual plastic materials have good barrier properties in relation to either water vapor or oxygen and carbon dioxide, but not however against water vapor or steam and oxygen/carbon dioxide to a sufficient extent for many ingredients to be contained in the container.

For special medicinal substances with minimal protection requirements and/or comparatively short storage times however, the container may be made of plastic material as the principal component. Up to now they are not widely used for parenteral preparations.

The glass containers for medicinal purposes currently on the market include tubular glass containers and blow-molded glass containers. The manufacturing methods for tubular glass containers and blow-molded glass containers are widely known. Tubular glass containers are made from pre-fabricated glass tubing by shaping and separation. Tubular glass containers include ampoules, bottles, cylindrical injector and syringe bodies, whose shape and size are standard. Blow-molded glass containers are made by shaping a glass melt directly by blowing or press-and-blow processes. The blow-molded glass containers include, for example, spray and infusion bottles, such as described in German Patent Document DE 196 22 550 A1 Glass containers for the above-named purposes also have the advantage in relation to plastic containers that they may be sterilized with known pharmaceutical methods, e.g. with heated air at temperatures of about 300° C. This is especially true when the container is made from borosilicate glass, because borosilicate glass has a high thermal shock resistance, which is also significant for the lyophilization process with temperatures between −45° C. and 30° C.

The container should also be closable with standard closure methods and have a high stability. On the other hand, it is indispensable for freeze-drying in a container that the container be lightweight, since a minimal container mass (heat capacity) is desirable for the freeze-drying process, in order to be able to perform these expensive thermal processes as fast and as economically as possible.

It is important for the freeze-drying process (synonymous with lyophilization process) to attain as uniform as possible a crystal structure for the lyophilizate (synonymous with dried product) in order to guarantee a uniform and rapid dissolution by the user and to keep the edge effects as small as possible. Furthermore it is very important for the freeze-drying that breaking the container during the freeze-drying process is avoided. Both conditions must be maintained by using suitable container dimensions.

It has already been suggested to provide an additive, such as calcium chloride and lactose, in order to at least reduce bottle breakage. However this type of feature is only rarely acceptable, since the pharmaceutical composition of the product contained in the container must be changed in order to adjust it to an otherwise unsuitable container.

An additional problem with freeze-drying is collapse, namely that the formation of an amorphous frozen product, which is not converted into the crystalline state, occurs during freeze-drying. This effect must also be considered during the making of the glass container.

Another circumstance must be considered.

Freeze-dried medicinal products are very expensive because of their accompanying very expensive manufacturing technology. Thus it is important to be able to take the liquid contents of the container with a dissolved lyophilizate completely from the container as soon as possible. This is not possible with the conventional glass tubing or blow-molded glass containers or requires troublesome handling, e.g., shaking together of individual droplets and removal with a vacuum tube, an injector needle, etc. It is not practical to automate this process because the drop distribution is determined by chance, so that a complete removal of the liquid from the container in the case of an automatic removal method, e.g. by an automatic analysis unit, as takes place in analysis of blood, etc., is possible only to a very limited extent. This complete emptying of this type of container of course is generally very important, not only in the case of a freeze-dried product.

Furthermore the use of silicon oil for surface modification of freeze-dried containers, is prohibited, since this can lead to undesirable impurities in the lyophilizate after freeze-drying. Beyond this the use of silicone for parenteral products should only be used in absolutely exceptional cases, since injection of silicone droplets in the body should be absolutely prevented. This also is true not only for freeze-dried products, but also for all injection/infusion preparations in liquid or solid form.

Furthermore for reasons of rational processing and use of containers for liquids in general and not only for freeze-dried medicinal preparations, storage of different containers should be kept to a minimum.

The known bottles, which should be made from glass or plastic, however do not fulfill the above-described specifications completely.

SUMMARY OF THE INVENTION

It is an object of the present invention to provide a universal container for medicinal purposes, especially for freeze-dried products, of the above-described type which meets the above-described requirements.

It is another object of the present invention to provide a container for medicinal purposes of the above-described type that is very lightweight and still stable, that allows lyophilization, that leads to a homogeneous or uniform dried product, that has a reduced danger of breaking during the freeze-drying process and that permits an almost complete emptying of the liquid lypophilizate and is useable universally for liquid and solid medicinal preparations.

The container according to the invention comprises a casing section with a bottom portion and an outlet section. It has a thin-walled casing in comparison to its base, a molded outlet portion that is closable by a conventional closure and a geometrically nonuniform bottom portion that has at least one interior depression, a reinforced section and an outer bottom surface that is completely planar or planar with only a slight central indentation.

The structure of the container according to the invention provides a lightweight container with greater stability and guarantees a lyophilization process that produces a uniformly freeze-dried product. The container has only a very slight breakage rate and can be nearly completely emptied. Furthermore it is universally useable for liquids and solid filling materials.

Different features for the bottom portion of the container are possible in various different embodiments that are claimed in the appended dependent claims.

An ampoule made from plastic is known with a special configuration for the bottom portion, which is described in Japanese Abstract JP 08322908.

The contents of the ampoules are typically transferred into syringes in use. Also the outlet section of the known ampoule is formed so that a needle-less injector or syringe can be mounted on the ampoule. In order to transfer the contents of the ampoule, this “top-head” must be empty so that the liquid contents can reach the syringe body. In order to make filling the injector or syringe easier, the bottom portion of the ampoule is conical with a central depression formed so that it is squeezed together. The known central depression does not have the purpose of guaranteeing complete emptying or removal of the liquid contained in the ampoule by collection of the liquid at the deepest portion of the container. This would only make a sense when an injector needle was provided which extended to the bottom of the ampoule. This however is not the case. The known bottom portion should not be too heavy, so that the ampoule is more easily crushed during its “top-head” emptying.

This function would not be possible in the case of an ampoule made from glass.

Furthermore the known ampoule has a pronounced bottom indentation. It is thus little suited for an in situ lyophilization, since the bottom portion does not guarantee the required surface contact with the cooling plate of the lyophilization device.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
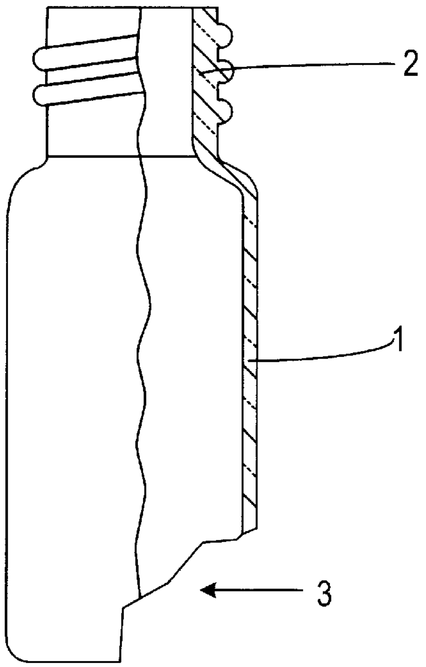
FIG. 1 is a partially cross-sectional, partially front view of a bottle according to the invention.
Figure 1A:
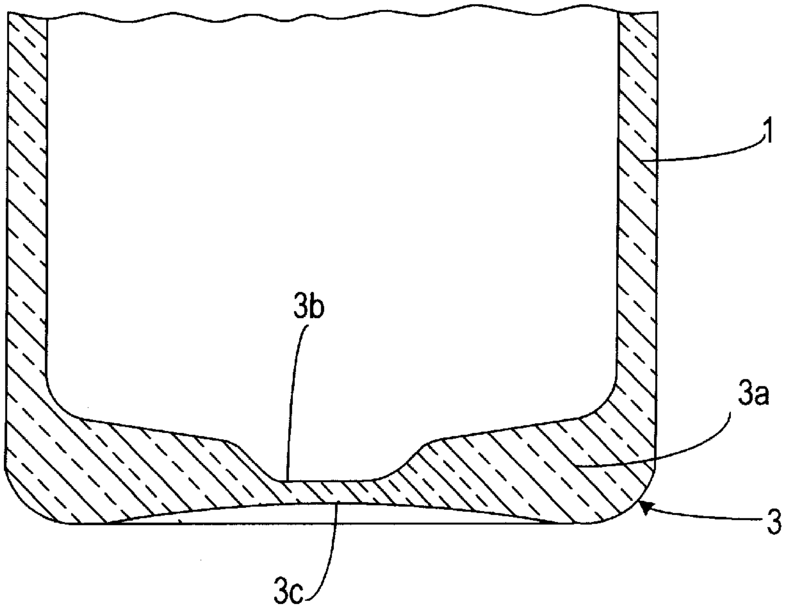
FIG. 1A is a detailed cutaway cross-sectional view through a bottom portion of the bottle shown in FIG. 1.

A container according to the invention is shown in FIG. 1. This container is a glass bottle, for example with a filling volume of 4 ml. The right hand side of FIG. 1 shows a cross-sectional view of the bottle. A detailed cross-sectional view of the bottom of the bottle is shown in FIG. 1A.

The glass bottle is preferably made from borosilicate glass tubing by state of the art methods.

Manufacture from tubular glass in the present case has the advantage that a comparatively large number of bottom configurations may be formed in a comparatively easy manner in contrast to manufacture from blow-molded glass.

The bottle has a cylindrical casing section 1, whose wall is comparatively uniformly thin in order to fulfill the requirements for a lightweight container. The 4 ml bottle in the present embodiment has a wall thickness of only 1 mm. An upwardly tapered neck or outlet section 2 is connected to the cylindrical casing section 1. The neck or outlet section 2 has a standard thread so that a standard screw cap can be used to provide the customary closure. The height of the neck or outlet section 2 amounts to about 9 mm in the present example and the length of the cylindrical casing section 1 amounts to about 23 mm so that the entire length of the bottle is about 35 mm. About 2 mm remains for the transition region between the cylindrical casing section 1 and the neck section 2. The interior diameter of the neck section 2 amounts to about 9 mm, while the outer diameter of the cylindrical casing section 1 is about 18 mm.

The massive bottom portion 3 and the geometrically inhomogeneous shape and nonuniform thickness of the container bottom portion 3 are characteristic for the bottles according to the invention. The bottom portion is clearly thicker than the wall of the cylindrical casing section 1. A reinforced section 3*a* of glass whose thickness is approximately three times the wall thickness of the cylindrical casing section 1 extends circumferentially around the container edge of bottom portion 3 in the embodiment according to FIG. 1A.

The container bottom portion 3 also has a central interior depression 3_b_ and an outer bottom surface indentation 3_c_ in a central region that is as small as possible, i.e. the distance of the center point of the container bottom portion 3 from the supporting surface for the container is as small as possible. In this example the indentation amounts to about 0.7 mm.

The weight of the container is thus only slightly greater than that of a comparable known container of the same filling volume, since only the bottom portion weight is increased.

The required stability is attained by providing this center point indentation and as large a base contacting surface as possible.

The interior depression 3_b_ in the container bottom portion allows the emptying of the container almost completely, since the liquid found in the container collects in the interior depression, i.e. the glass container according to the invention has only a residual volume of less than 1% of the filling volume in regard to container contents, and moreover can be emptied automatically.

Freeze-drying experiments have shown an additional surprising effect of the described nonuniform bottom shape: a very uniform crystalline freeze-dried product (lyophilizate) is formed, without collapsed amorphous regions. A rotationally symmetric lyophilizate structure can be obtained. The freeze-drying process was not measurably retarded in spite of the on-the-average greater bottom portion mass in comparison to the standard containers. Furthermore the specially formed bottom portion considerably reduces the number of broken bottles during lyophilization. The number of broken bottles during freeze-drying of 3% mannitol solutions with a filling height of 24 mm (filling volume about 10 ml) is only 10% of the number of broken standard bottles for the same conditions. The experimental conditions correspond to the known parameters.

Different embodiments of the bottle bottom portion shown in FIG. 1A are possible, in which the limiting factor is always the ratio of the glass diameter of the starting glass tubing to the wall thickness. Five different embodiments are shown in FIGS. 2A to 2E.

Figure 2A:
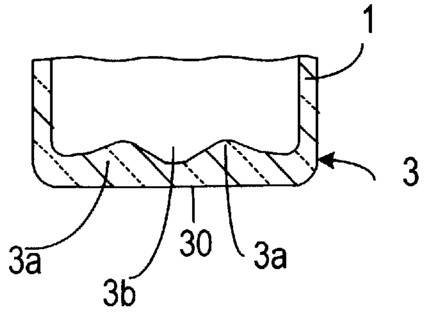
FIGS. 2A to 2E are respective detailed cutaway cross-sectional views through alternative embodiments of the container bottom of the container according to the invention.

In the embodiment of FIG. 2A the reinforced section 3_a_ is an annular bead that is thicker than the pan-like central interior depression 3_b_. Furthermore the bottom portion 3 has a flat outer bottom surface 3_o_. Also the bottom portion 3 in the embodiment of FIG. 2B has a flat bottom.

Figure 2B:
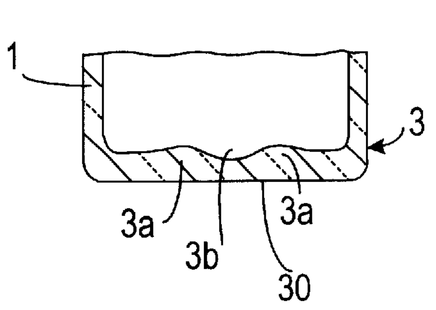

The embodiment of FIG. 2B differs from that of FIG. 2A by a considerably reduced reinforced section 3_a_ and a flatter interior depression 3_b_.

Figure 2C:
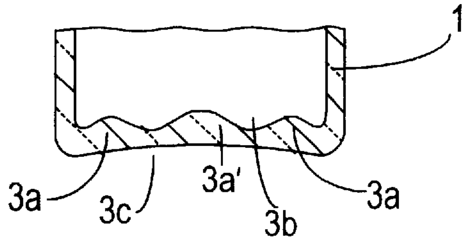

A central reinforced section 3_a_', a concentric annular bead 3_a_ and a circumferential interior depression 3_b_ in connection with a gentle outer bottom surface indentation 3_c_ of the bottom center than shown in FIG. 1A in the present case are provided in the embodiment shown in FIG. 2C.

Figure 2D:
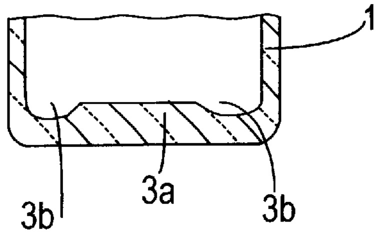

The embodiment of FIG. 2D has a flat bottom surface on its bottom portion, single pedestal-shaped reinforced section 3_a_ and a gutter-like peripheral depression 3_b_ at its edge.

Figure 2E:
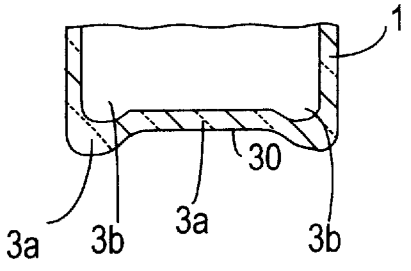

The embodiment according to FIG. 2E is in principal like that of FIG. 2D, however the central glass reinforced section 3_a_ is less pronounced. Also a peripheral reinforcing bead 3$a_1$ is formed on the flat outer bottom surface 3_o_ of the bottom portion 3 at the lower bottom edge.

In the embodiments of the invention described up to now the container according to the invention is made of glass with a circular cross section. However it can also be made of plastic material.

The plastic container according to the invention can be made in a simple way with known plastics technology methods, such as injection molding, injection die-casting, immersion blowing. The desired geometric nonuniform interior base shape can be made by insertion of a die that has the corresponding opposite shape.

The container is preferably made from a plastic material, which is translucent or transparent, so that e.g. the freeze-dried substance is accessible on dissolving it immediately prior to use by a professional, e.g. by a medical professional. Preferably the translucent plastic material used should have a light transmission degree of greater than 90% according to ASTM 1003 at a wall thickness of 2 mm. When the plastic material used is not sufficiently transparent, one skilled in the art can increase the transparency by addition of known additives according to the state of the art.

The plastic material for the container for lyophilization and storage of slightly acid sensitive substances is selected with a density of <1.1 g/cm$^3$, a water vapor permeability according to DIN 53122 at a thickness of 1 mm of <0.1 g/m$^2$d and/or a water absorption of <0.05% according to ASTM D 570. Plastic materials with these specifications include cycloolefin polymers or cycloolefin copolymers, such those marketed under the trade names TOPAS® (all types) of Ticona; ZEONEX® of Nippon Zeon (all types, preferably ZEONEX®250 and ZEONEX®280) or APEL® of Misui. Cycloolefin polymers or copolymer with a water vapor permeability according to DIN 53122 of <0.03 g/m$^2$d and a thermal shape stability temperature (HDTB/B (0.45 N/mm$^2$) according to ISO 75 Parts I and II in the range between 50° C. and 90° C., such as TOPAS®8007 with a glass transition temperature in a range of 60° C. to 100° C.

The plastic materials for the container for lyophilization and storage of very acid sensitive substances are selected from the group with a density of not less than 1.4 g/cm$^3$ and an acid permeability of <50 cm$^3$/m$^2$d bar at a layer thickness of 100 μm. Plastic materials with these specification are for example made of polymers based on polyethylene terephthalate (PET), glycol-modified polyethylene terephthalate (PETG), oriented PET (O-PET) or polyethylene naphthalate (PEN).

The use of plastic material for the container according to the invention allows containers to be made with cross sections that are non-circular in a comparatively simple manner. To improve the thermal behavior in the lyophilization process it is advantageous when the container 10 according to the invention has planar side surfaces 11, which are in a position to be in a planar contact with the side surfaces 11 of neighboring containers 10. The transverse cross-section of this sort of container body can be preferably triangular, quadrangular or six-sided. Typical examples are shown in FIGS. 3A, 3B, 3C and 3D. If the cross section is triangular, then at least two of the three sides are preferably equal. The preferred triangular cross section is equilateral. In the case of the quadrangular cross section at least two sides opposite each other are parallel to each other. The quadrangular cross section can be shaped like a trapezoid, a parallelogram, a rhombus, a rectangle and especially a square.

A six-sided cross section in which two sides opposite each other are of equal length (FIG. 3C) is however the preferred cross section. In the most preferred six-sided cross section all the sides are of equal length (FIG. 3D).

Figure 3A:
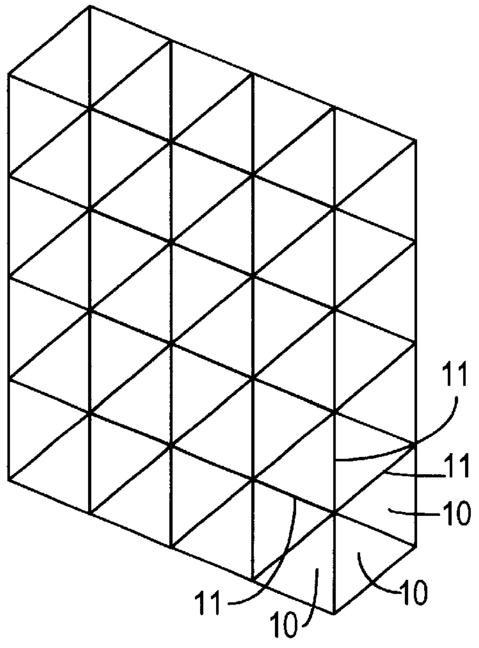
FIG. 3A is a plan view of a transverse cross section through the casing section of a first embodiment of a container according to the invention having planar sides surfaces for contacting neighboring containers, in which the cross section is triangular.
Figure 3B:
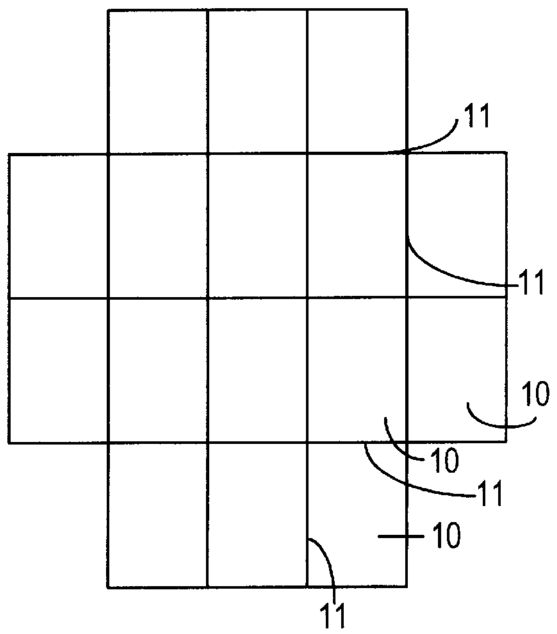
FIG. 3B is a plan view of a transverse cross section through the casing section of another embodiment of a container according to the invention having planar sides surfaces for contacting neighboring containers, in which the cross section is square.
Figure 3C:
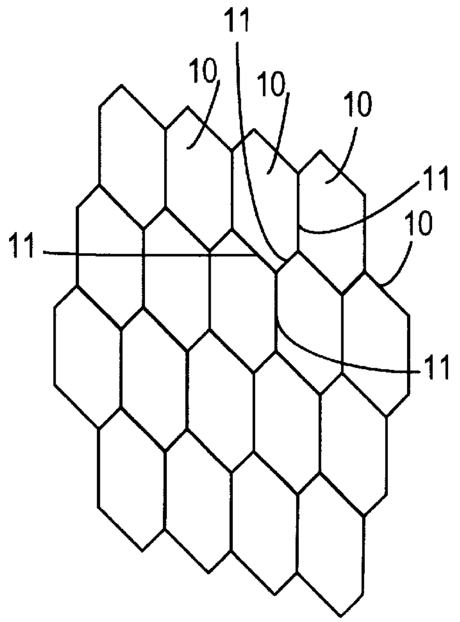
FIG. 3C is a plan view of a transverse cross section through the casing section of a further embodiment of the container according to the invention having planar sides surfaces for contacting neighboring containers, in which the cross section is six-sided, with two opposite sides parallel to each other of equal length.
Figure 3D:
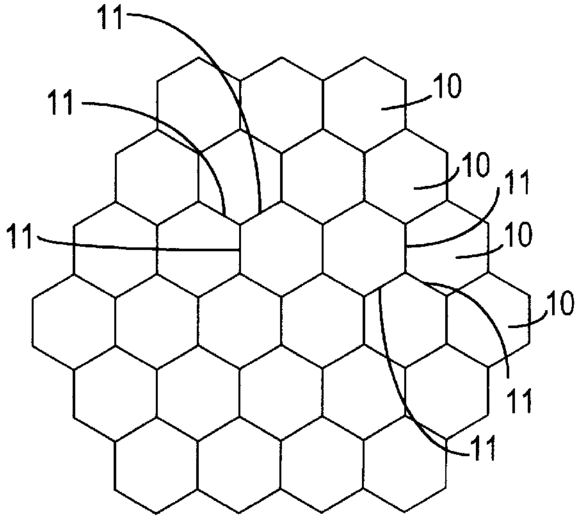
FIG. 3D is a plan view of a transverse cross section through the casing section of a most preferred embodiment of the container according to the invention having planar sides surfaces for contacting neighboring containers, in which the cross section is six-sided with all sides of equal length.

When the side surfaces of the containers are planar and the containers have the cross-sections as described in FIGS. 3A to 3D, especially FIG. 3D, the containers for lyophilization can be arranged according to a batch process in a lyophilization chamber, so that the available space is used in an optimum manner. The planar form of the side surfaces of the container casings together with the triangular, quadrangular or six-sided cross-sectional form allows each container of a batch to be arranged so that its side surfaces come into contact with the side surfaces on neighboring containers, unless of course it is in a position on the outer edge of the group of containers. Besides the optimum use of space in the chamber this has the result that heat transfer and balancing occurs during the lypophilization process in spite of the usual reduced thermal conductivity of the plastic in comparison to glass, so that a more or less uniform temperature distribution arises in all the containers of a batch. The dead space between the containers occurring unavoidably with circular cross sectioned containers, which results in a thermal isolation of the individual containers, does not occur with the containers having corners. Also increased heat exchange between the bottom plate of the lyophilizator (cooling plate) and the material to be lyophilized in the containers can occur in comparison to glass bottles in addition to the uniform heat exchange between the individual containers. Since the bottom surface has an indentation of less than 0.5 mm heat exchange is improved in comparison with the more or less indented bases of conventional containers made of glass.

With a predetermined amount of material to be lyophilized and a predetermined available surface area in the lyophilizator less time is required for the lyophilization when the containers with corners are used instead of the conventional round bottles. Since the material to be lyophilized in a predetermined volume can be distributed over a larger surface region (they make dead space occur with circular or round bottles available), a smaller filling height can be used than with the round container bodies for the same volume, whereby the ratio of 'active surface area' to filling height in the container and thus the efficiency of the sublimation of the ice from the active surface is increased. One then requires a smaller available surface area and thus reduced freeze-drying unit than with the round glass bottles when the cornered containers are used.

The containers with the cornered casing cross section according to that shown in FIGS. 3A to 3D have a geometrically nonuniform base portion analogous to that shown in FIG. 2. However preferably the reinforcing sections and the depressions are not rotationally symmetric, but are formed according to the geometric shape of the cross section.

The disclosure in German Patent Application 198 31 112.5-43 of Jul. 11, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a universal container for medicinal purposes, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A container for in situ freeze-drying of a liquid medicinal preparation, said container comprising a casing section (1) with a bottom portion (3) and an outlet portion (2), wherein the casing section (1), the bottom portion (3) and the outlet portion (2) each consist of glass and the casing section (1) is thin-walled in comparison to all sections of the bottom portion (3), the outlet portion (2) is formed so as to be closable by a closure device, the bottom portion has a nonuniform geometry and wherein said bottom portion (3) is provided with at least one interior depression (3*b*), a reinforced section (3*a*) that is thicker than the at least one interior depression (3*b*), and wherein said at least one interior depression (3*b*) consists of a central rotationally symmetric depression and an outer peripheral rotationally symmetric depression and said reinforced section (3*a*) is an interior circumferential reinforced section extending circumferentially surrounding said central rotationally symmetric depression and said outer peripheral depression extends around said reinforced section (3*a*);

wherein said bottom portion (3) has an outer bottom surface (3*o*) that is completely planar or planar with a comparatively slight central indentation (3*c*) so that sufficient surface contact is possible between said bottom surface (3*o*) and a cooling plate of a lyophilization device, whereby uniform crystalline freeze-drying of a liquid medicine contained in said container takes place during said freeze-drying with said lyophilization device.

2. A container for in situ freeze-drying of a liquid medicinal preparation, said container comprising a casing section (1) with a bottom portion (3) and an outlet portion (2), wherein the casing section (1), the bottom portion (3) and the outlet portion (2) each consist of glass and the casing section (1) is thin-walled in comparison to all sections of the bottom portion (3), the outlet portion (2) is formed so as to be closable by a closure device, the bottom portion has a nonuniform geometry and wherein said bottom portion (3) is provided with at least one interior depression (3*b*), a reinforced section (3*a*) that is thicker than the at least one interior depression (3*b*), and wherein said reinforced section (3*a*) consists of a central reinforced region and a peripheral reinforced region concentric to said central reinforced region and said at least one interior depression (3*b*) consists of a circumferential rotationally symmetric depression between said peripheral reinforced region and said central reinforced region;

wherein said bottom portion (3) has an outer bottom surface (3*o*) that is completely planar or planar with a comparatively slight central indentation (3*c*) so that sufficient surface contact is possible between said bottom surface (3*o*) and a cooling plate of a lyophilization device, whereby uniform crystalline freeze-drying of a liquid medicine contained in said container takes place during said freeze-drying with said lyophilization device.

3. A container for in situ freeze-drying of a liquid medicinal preparation, said container comprising a casing section (1) with a bottom portion (3) and an outlet portion (2), wherein the casing section (1), the bottom portion (3) and the outlet portion (2) each consist of glass and the casing section (1) is thin-walled in comparison to all sections of the bottom portion (3), the outlet portion (2) is formed so as to be closable by a closure device, the bottom portion has a nonuniform geometry and wherein said bottom portion (3) is provided with at least one interior depression (3*b*), a reinforced section (3*a*) that is thicker than the at least one interior depression (3*b*), and wherein said reinforced section (3*a*) consists of a pedestal-shaped central reinforced region and said at least one interior depression (3*b*) consists of a peripheral rotationally symmetric depressed region extending around said pedestal-shaped central reinforced region;

wherein said bottom portion (3) has an outer bottom surface (3*o*) that is completely planar or planar with a comparatively slight central indentation (3*c*) so that sufficient surface contact is possible between said bottom surface (3*o*) and a cooling plate of a lyophilization device, whereby uniform crystalline freeze-drying of a liquid medicine contained in said container takes place during said freeze-drying with said lyophilization device.

4. The container as defined in claim 1, 2 or 3, made of tubular glass.

5. The container as defined in claim 1, 2 or 3, made of borosilicate glass.

6. The container as defined in claim 3, wherein said outer bottom surface (3*o*) has a peripheral reinforcing bead ($3a_1$) extending around a lower bottom edge of said outer bottom surface.

* * * * *